United States Patent
Lee et al.

(10) Patent No.: US 10,503,354 B2
(45) Date of Patent: Dec. 10, 2019

(54) SYSTEM FOR CONTROLLING MOBILE INFORMATION OUTPUT BY USING MULTIPLE ACCESS ICONS, AND METHOD THEREFOR

(71) Applicants: TWMOBILE CO., LTD, Seoul (KR); Se-yong Lee; Kyo-sik Hong

(72) Inventors: Se-yong Lee, Seoul (KR); Kyo-sik Hong, Seongnam (KR); Hyun-Joo Jeon, Yongin (KR)

(73) Assignees: TW Mobile Co., LTD., Seoul (KR); Se-yong Lee, Seoul (KR); Kyo-sik Hong, Seongnam-si (KR)

( * ) Notice: Subject to any disclaimer, the term of this patent is extended or adjusted under 35 U.S.C. 154(b) by 67 days.

(21) Appl. No.: 15/307,552

(22) PCT Filed: Apr. 24, 2015

(86) PCT No.: PCT/KR2015/004128
§ 371 (c)(1),
(2) Date: Oct. 28, 2016

(87) PCT Pub. No.: WO2015/167175
PCT Pub. Date: Nov. 5, 2015

(65) Prior Publication Data
US 2017/0060382 A1    Mar. 2, 2017

(30) Foreign Application Priority Data
Apr. 29, 2014 (KR) .......................... 10-2014-0051761

(51) Int. Cl.
*G06F 17/20* (2006.01)
*G06F 3/0481* (2013.01)
(Continued)

(52) U.S. Cl.
CPC .......... *G06F 3/04817* (2013.01); *G06F 3/048* (2013.01); *G06F 3/04842* (2013.01); *G06Q 30/0256* (2013.01); *G06Q 30/0267* (2013.01)

(58) Field of Classification Search
CPC ................................................. G06F 3/04817
See application file for complete search history.

(56) References Cited

U.S. PATENT DOCUMENTS

| | | | |
|---|---|---|---|
| 2011/0040690 A1* | 2/2011 | Araiza-Boys | G06Q 30/02 705/80 |
| 2014/0047359 A1* | 2/2014 | Teigene | G06F 17/30864 715/760 |
| 2014/0129973 A1* | 5/2014 | Guo | G06F 16/3322 715/780 |

FOREIGN PATENT DOCUMENTS

| | | |
|---|---|---|
| KR | 10-2005-0102182 A | 10/2005 |
| KR | 10-2007-0122218 A | 12/2007 |
| KR | 10-2010-0057730 A | 6/2010 |

* cited by examiner

*Primary Examiner* — Keith D Bloomquist
(74) *Attorney, Agent, or Firm* — Patent Office of Dr. Chung Park (57) ABSTRACT

The present invention relates to a system for controlling mobile information output by using multi-access icons according to the embodiment of the present invention, which is a system in which a primary exposure effect through visual recognition is obtained by outputting multi-access icons including specific company names or product names in a predetermined portion of a search box, and a variety of event information including discount information or payment information on the companies or products may be conveniently exposed or a mobile page of the companies or products may be output when directly clicking the multi-
(Continued)

access icons or clicking a search button, such that information in different paths may be easily output, and a method therefor.

14 Claims, 6 Drawing Sheets

(51) Int. Cl.
*G06F 3/048* (2013.01)
*G06F 3/0484* (2013.01)
*G06Q 30/02* (2012.01)

FIG. 6

SYSTEM FOR CONTROLLING MOBILE INFORMATION OUTPUT BY USING MULTIPLE ACCESS ICONS, AND METHOD THEREFOR

CROSS-REFERENCE TO RELATED APPLICATIONS

This application is a national Stage Patent Application of PCT International Patent Application No. PCT/KR2015/004128, filed on Apr. 24, 2015 under 35 U.S.C. § 371, which claims priority of Korean Patent Application No. 10-2014-0051761, filed on Apr. 29, 2014, which are all hereby incorporated by reference in their entirety.

TECHNICAL FIELD

The present invention relates to a system for controlling mobile information output by using multi-access icons and a method therefor, and more particularly, to a system for controlling mobile information output by using multi-access icons and a method therefor, in which the multi-access icons including specific company names or product names are output in a predetermined portion of a search box, and different information is output according to a click position.

BACKGROUND ART

As well known in the art, in accordance with recent development of information communication techniques, a technique for information service that provides information on various fields by a wide area data communication network in real time to multiple subscribers through at least one host server has been actively developed.

In a capitalist society, a goal of a company is to make profit. In order to sell more products at a better price, it is necessary for the company to improve an image of the company or a product, and more importantly, to exposure information on the company or the product to consumers more frequently.

Further, it is urgently needed to more easily perform a series of sales from an exposure and search of the product to a payment thereof in conjunction with each other, thereby maximizing convenience for the consumers, and to expand a regular customer management that is the most important from offline to online.

However, in a case of an advertisement through a television or newspaper media that is a conventional advertisement, costs thereof are excessively large, thus small and medium-sized companies cannot afford the advertisement at all, and in a case of an internet search advertisement of large portal sites having higher power of influence and cheaper costs than the existing media, although the costs thereof are cheaper than those of the existing media, but it is still needed for the small and medium-sized companies to pay an inconsiderable amount of money for the advertisement.

In addition, in the case of the existing search advertisement using the internet portal site, only the searched advertisement is simply provided. Thus, there is no means for enlarging offline customers to online customers, and a series of sales from the exposure and search of the product to the payment thereof may be not performed in conjunction with each other.

DISCLOSURE

Technical Problem

In consideration of the above-mentioned circumstances, it is an object of the present invention to provide a system for controlling mobile information output by using multi-access icons and a method therefor, in which a primary exposure effect through visual recognition is obtained by outputting multi-access icons including specific company names or product names in a predetermined portion of a search box, and a variety of event information including discount information or payment information on the companies or products may be conveniently exposed or a mobile page of the companies or products may be output when directly clicking the multi-access icons or clicking a search button, such that information in different paths may be easily output.

Technical Solution

In order to achieve the above object, according to one aspect of the present invention, there is a provided a method for controlling mobile information output by using multi-access icons, including the steps of: a) downloading and installing an icon search control application 14, in which a specific multi-access icon 10 is fixedly displayed in a search box 8, in a user terminal 2; b) receiving, by the icon search control application 14, a driving signal to output a main screen 6 of the icon search control application; c) determining, by the icon search control application 14, whether an operating signal of a search button 12 is applied in a state in which the multi-access icon 10 is displayed in the search box 8; d) receiving, by the icon search control application 14, a mobile page matched with the multi-access icon 10 from a multi-access search information management server 20 to output the mobile page on the screen, when the operating signal of the search button 12 is applied; e) determining, by the icon search control application 14, whether a click signal of the multi-access icon 10 is applied, when the operating signal of the search button 12 is not applied; f) outputting, by the icon search control application 14, pre-stored event information 30 associated with the multi-access icon 10 on the screen, when the click signal of the multi-access icon 10 is applied; g) determining, by the icon search control application, whether a click signal for a remaining area 28 other than the multi-access icon 10 in the search box 8 is applied, when the click signal of the multi-access icon 10 is not applied; h) removing, by the icon search control application 14, the multi-access icon 10 to activate the search box 8 to be a state in which a search word is input, when the click signal for the remaining area 28 is applied; and I) receiving, by the icon search control application 14, the search word to perform a search together with the multi-access search information management server 20.

Preferably, the method further includes the steps of: before step a), accepting, by the multi-access search information management server 20, a request signal for registering a seller-dedicated multi-access icon 10; receiving information on the seller-dedicated multi-access icon 10, event information matched with the corresponding multi-access icon 10, and URL information of a mobile page of the seller; registering, by the multi-access search information management server 20, information on the seller; processing, by the multi-access search information management server 20, the icon search control application 14 so as to display the multi-access icon 10 in the search box 8; and registering, by the multi-access search information management server 20, the processed icon search control application 14 in a downloadable way by matching the same with the information on the seller.

Preferably, the method further includes the steps of: between step a) and step b), transmitting, by the icon search control application 14, download information to the multi-access search information management server 20; and tallying, by the multi-access search information management server 20, the download information of the application for each seller using identification information of the application.

Preferably, when step a) further includes the step of downloading, by the icon search control application 14, a plurality of advertisement icons 70 from the multi-access search information management server 20, steps b) to g) repeatedly perform the steps of: determining, by the icon search control application 14, whether a preset time elapses; and when the preset time elapses, displaying, by the icon search control application 14, a next advertisement icon 70 in the search box 8 so as not to overlap with each other.

Preferably, the method further includes the step of: before step d), transmitting, by the icon search control application 14, multi-access icon identification information, mobile terminal identification information, and search button operation information to the multi-access search information management server 20.

According to another aspect of the present invention, there is a provided a system for controlling mobile information output by using multi-access icons, including: a user mobile terminal 2, in which an icon search control application 14 configured to perform a control so that a multi-access icon 10 is operably displayed in a search box 8 to selectively output event information 30 or a mobile page 44 on which information on companies or products is published, and perform communication with a multi-access search information management server 20 for outputting information associated with the multi-access icon 10 on a screen, is installed; and the multi-access search information management server 20 configured to publish the icon search control application 14 in a downloadable way, and transmit event information and information of a mobile page that are output on the screen when clicking the multi-access icon 10 output on a main screen 6 of the icon search control application 14 or when clicking a search button 12.

Preferably, the icon search control application 14 is configured to control an output state of the search box 8 so that the specific multi-access icon 10 is fixedly output in the search box at all times.

Preferably, the icon search control application 14 is configured to remove the multi-access icon 10, such that another search word is input, when a remaining area 28 other than an output area of the multi-access icon 10 in the search box 8 is clicked.

Preferably, the icon search control application 14 is configured to output the event information 30 including information on the companies or discount information of the products or simple product information, and information for inputting order and payment information, by directly clicking the multi-access icon 10 displayed in the search box 8.

Preferably, the icon search control application 14 is configured to automatically transmit information of the multi-access icon 10 and the search button 12 to the multi-access search information management server 20 when clicking the search button 12 in a state in which the specific multi-access icon 10 is displayed in the search box 8, and the multi-access search information management server 20 is configured to extract the mobile page 44 matched with the multi-access icon 10 and the search button 12 in advance and transmit the extracted mobile page.

Preferably, the multi-access search information management server 20 is configured to accept and register a distribution request signal of the icon search control application 14 in which the multi-access icon 10 including specific company names or product names is fixedly displayed in the search box 8 from an advertiser terminal 22.

Preferably, the system further includes: a download URL relay server 24 configured to publish and distribute URL information of a download window of the multi-access search information management server 20 for downloading the icon search control application 14 in which the multi-access icon 10 including the specific company names or the product names is fixedly displayed, so that the user terminal 2 accesses the download window.

Preferably, the icon search control application 14 is configured to change the multi-access icon 10 output in the search box 8 so as not to overlap at a predetermined time interval.

Preferably, the multi-access icon 10 is an icon that includes a text or an image and allows a user to access event information and a mobile page associated with the specific company names, product names, service names, or election candidates.

Preferably, the icon search control application 14 includes: a communication module 50 configured to communicate with the multi-access search information management server 20 or the download URL relay server 24; an application identification code manager 52 configured to manage an application identification code to be included when data is transmitted to a remote server; an icon publication information manager 57 configured to manage publication information of the icon search control application 14 in which the specific multi-access icon 10 is fixed in the search box 8; a click position sensing unit 58 configured to determine whether the search button 12, the remaining area other than the multi-access icon 10, or the multi-access icon 10 is clicked in a state in which the specific multi-access icon 10 is displayed in the search box 8; a search information relay processor 60 which relays to transmit a search word input in the search box 8 to the multi-access search information management server 20, and receive a result value thereof; an event window control information transmitter 62 configured to control a menu published in the event information that is output by clicking the multi-access icon 10, or transmit input information input in an input window to the multi-access search information management server; a multi-access icon output controller 64 configured to control the multi-access icon 10 to be output in the search box 8, and control the multi-access icon 10 to be removed, when the remaining area 28 in the search box 8 is clicked; and a controller 66 configured to control the respective units so as to output data by detecting a click on the multi-access icon 10 that is fixedly output in the search box 8 for each application and the remaining area 28 other than the multi-access icon 10, and control the mobile page so as to be output by clicking the search button in a state in which the multi-access icon 10 is fixed in the search box 8.

Preferably, the icon search control application 14 further includes: a seller event information storage unit 54 configured to receive event information of a seller that is output on the screen when the multi-access icon 10 is clicked at the time of driving the application from the multi-access search information management server 20, and store the received event information; and a data update unit 56 configured to update the event information of the seller.

Preferably, the icon search control application 14 further includes: an advertisement icon output controller 65 configured to control advertisement icons 70 to be output so as not to overlap with each other at a predetermined time interval on a position of the multi-access icon 10.

Preferably, the system further includes: a near field communication (NFC) card 26 configured to publish and distribute URL information of a download page of the multi-access search information management server 20 that is read by the user terminal 2 using a near field wireless communication scheme to download the icon search control application 14.

Advantageous Effects

According to the system for controlling mobile information output by using multi-access icons and the method therefor in accordance with the present invention, in the application including the search box, multi-access icons associated with the specific companies or products are output in the search box, and the event information including discount information capable of simply outputting an order/payment window may be output using the multi-access icons. Since a user may access the mobile page of the companies or the products, the main screen of the application is not annoyingly covered by a plurality of pop-up advertisements, and since the user may recognize the pre-displayed multi-access icons when inputting a search word, advertising effects may be significantly increased. When clicking the multi-access icons, the user may access the discount information or the event information, such that the click-through rate may be more increased, resulting in more increased advertising effects and a seller may provide larger benefits to loyal customers who installed the application of their company.

BEST MODE

Hereinafter, the present invention will be described in detail with reference to the accompanying drawings.

Figure 1:
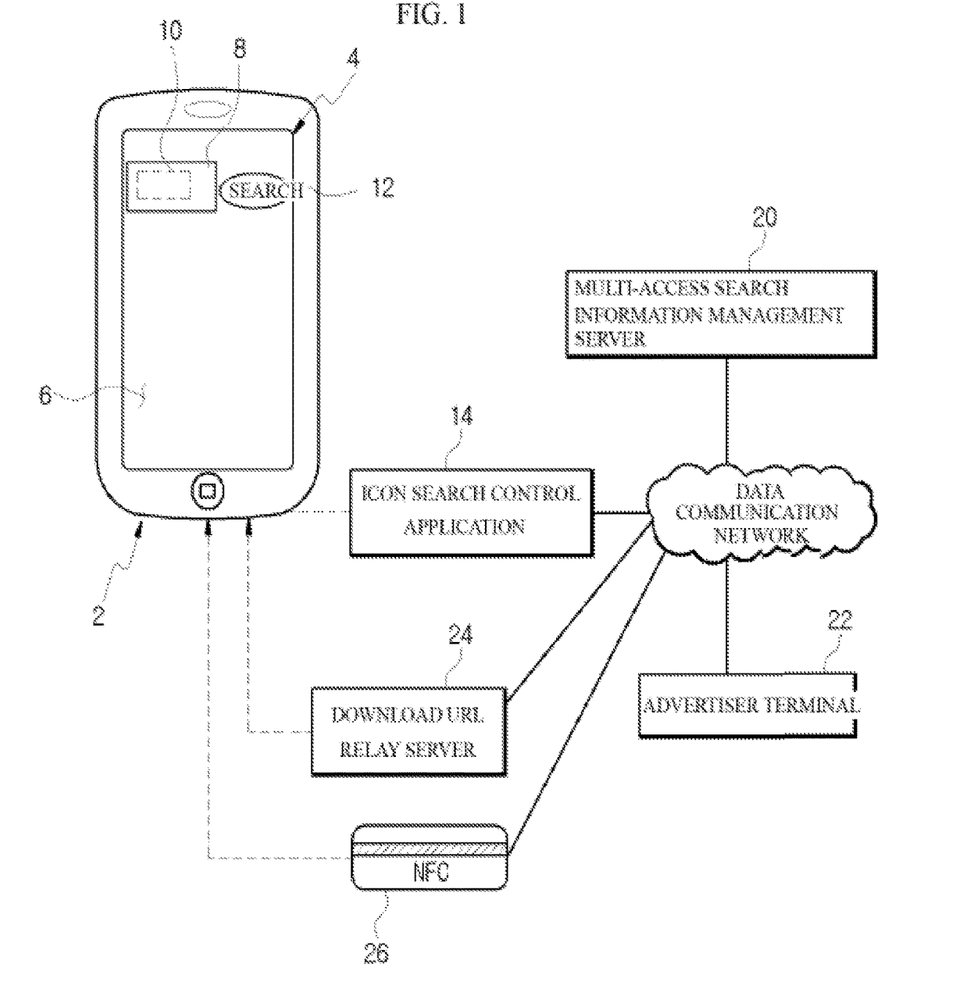
FIG. 1 is a diagram schematically illustrating a configuration of a system for controlling mobile information output by using multi-access icons according to an embodiment of the present invention.
Figure 2:
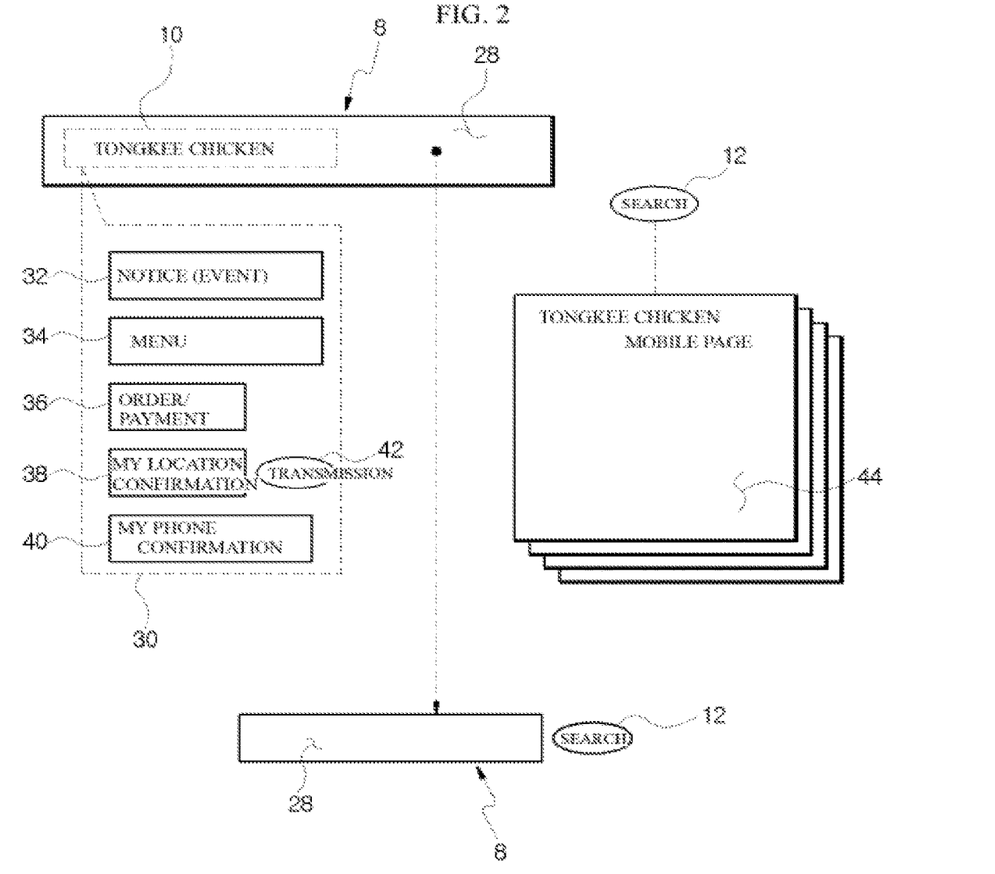
FIG. 2 is a diagram illustrating an access state of a multi-access icon through the system for controlling mobile information output by using multi-access icons according to the embodiment of the present invention.

FIG. 1 is a diagram schematically illustrating a configuration of a system for controlling mobile information output by using multi-access icons according to an embodiment of the present invention, and FIG. 2 is a diagram illustrating an access state of a multi-access icon through the system for controlling mobile information output by using multi-access icons according to the embodiment of the present invention.

Referring to FIGS. 1 and 2, the system for controlling mobile information output by using multi-access icons according to the embodiment of the present invention is a system in which a primary exposure effect through visual recognition is obtained by outputting multi-access icons including specific company names or product names in a predetermined portion of a search box, and a variety of event information including discount information or payment information on the companies or products may be conveniently exposed or a mobile page of the companies or products may be output when directly clicking the multi-access icons or clicking a search button, such that information in different paths may be easily output.

More specifically, the system for controlling mobile information output by using multi-access icons according to the embodiment of the present invention is a system distributing an icon search control application so that a multi-access icon 10 for outputting event information 30 or a mobile page 44 on which information on companies or products is published is displayed in a search box 8 output on a screen of a user mobile terminal 2.

That is, to distribute the icon search control application 14 capable of searching mobile pages for a plurality of companies or products so that the icon search control application may be downloaded and installed in the user terminal 2, the system for controlling mobile information output by using multi-access icons according to the embodiment of the present invention may distribute the icon search control application 14 by fixing a specific multi-access icon 10 to be output in the search box 8 at all times that is output on a main screen 6 of the icon search control application.

That is, a user may download and install the icon search control application 14 in the user terminal 2. The user may install an icon search control application 14 in which a multi-access icon 10 of "Tongkee Chicken (registered trademark)" is fixedly output in the search box 8, and may also install an icon search control application 14 in which a multi-access icon 10 of "iPhone (registered trademark)" is fixedly output in the search box 8.

Herein, when the user clicks a search button 12 in a state in which the multi-access icon 10 of "Tongkee Chicken" is output in the search box 8, a mobile page 44 of "Tongkee Chicken" is output on the screen.

Further, when the user directly clicks the multi-access icon 10 of "Tongkee Chicken" output in the search box 8, the event information 30 registered by a seller in a multi-access search information management server 20 is output.

In addition, in a case in which the user tends to search another search word using the icon search control application 14, if the user clicks the remaining area 28 other than the multi-access icon 10 in the search box 8, the multi-access icon 10 is removed from the search box 8, such that another search word may be input.

That is, the multi-access icon 10 is fixedly output in the search box 8, however, when the user tends to input another search word, the multi-access icon 10 may be removed.

Further, the multi-access icon 10 may also output the mobile page 44 associated with the multi-access icon 10, and output the event information 30 such as the discount information on the screen, thus the user may access multiple information through a single icon.

To this end, the system for controlling mobile information output by using multi-access icons according to the embodiment of the present invention includes the user mobile terminal 2, in which the icon search control application 14 configured to perform a control so that the multi-access icon 10 is operably displayed in the search box 8 to be able to selectively output the event information 30 or the mobile page 44 on which the information on the companies or products is published, and perform communication with the multi-access search information management server 20 for outputting the information associated with the multi-access icon 10 on the screen, is installed; and the multi-access search information management server 20 configured to publish the icon search control application 14 in a downloadable way, and transmit the event information and the information of the mobile page that are output on the screen when clicking the multi-access icon 10 output on the main screen 6 of the icon search control application 14 or when clicking the search button 12.

Herein, as described above, the icon search control application 14 is an application configured to control an output state of the search box so that the specific multi-access icon 10 is fixedly output in the search box 8 at all times.

In addition, the icon search control application 14 is configured to remove the multi-access icon 10, such that another search word may be input, if the user clicks the remaining area 28 other than the output area of the multi-access icon 10 in the search box 8.

Meanwhile, as illustrated in FIG. 2, the icon search control application 14 is configured to output the event information 30 including the information on the companies or discount information of the products or simple product information, and information for inputting order and payment information, by directly clicking the multi-access icon 10 displayed in the search box 8.

The event information 30 may include an event 32 such as a brief notice and a discount, information on a product menu 34, and information 36 on an order and payment of the products, and may further include a "My Location Confirmation" button 38, a "My Phone Confirmation" button 40, and a transmission button 42, so that, when the company associated with the multi-access icon 10 is a delivery company, the user may easily transmit a location of an orderer to the company.

That is, when operating the "My Location Confirmation" button 38, the icon search control application 14 works in conjunction with a GPS module (not illustrated) mounted in the user terminal 2 to transmit the location of the user to the company. Then, it is possible to avoid food delivery prank calls.

Meanwhile, as described above, the icon search control application 14 is configured to automatically transmit information of the multi-access icon 10 and the search button 12 to the multi-access search information management server 20 when clicking the search button 12 in a state in which the specific multi-access icon 10 is displayed in the search box 8, and the multi-access search information management server 20 is configured to extract the mobile page 44 matched with the multi-access icon 10 and the search button 12 in advance and transmit the extracted mobile page.

Meanwhile, the system for controlling mobile information output by using multi-access icons according to the embodiment of the present invention may distribute the icon search control application 14 including the multi-access icon 10 in the search box 8, and the multi-access search information management server 20 is configured to accept and register a distribution request signal of the icon search control application 14 in which the multi-access icon 10 including specific company names or product names is fixedly displayed in the search box 8 from an advertiser terminal 22.

The inventive system further includes a download URL relay server 24 configured to publish and distribute URL information of a download window of the multi-access search information management server 20 for downloading the icon search control application 14 in which the multi-access icon 10 including the specific company names or the product names is fixedly displayed, so that the user terminal 2 accesses the download window, when the application is registered in the multi-access search information management server 20.

Further, the inventive system may further include a near field communication (NFC) card 26 configured to publish and distribute URL information of the download page of the multi-access search information management server 20 that is read by the user terminal 2 using a near field wireless communication scheme to download the icon search control application 14.

That is, when a user tends to download and install the icon search control application 14, the user may directly use the user terminal 2 to access the multi-access search information management server 20 and search and download a specific icon search control application 14 in which the multi-access icon 10 associated with the specific companies or products is displayed in the search box 8. The user may also access a website or a mobile page of the company associated with the multi-access icon 10 to download and install the icon search control application 14 published on the website or the mobile page of the company.

Further, the user may also access the website or the mobile page of the company, or the website of the server in which the user may download the icon search control application 14, by coming the known NFC card 26 that allows the user to directly access the download page into contact with the user terminal 2.

Furthermore, the multi-access icon 10 is an icon that includes a text or an image and allows the user to access the event information and the mobile page associated with the specific company names, product names, service names, or election candidates.

When the multi-access icon 10 is an election candidate, the multi-access icon 10 may be utilized for party members to allow their acquaintances to more easily access the mobile page of the election candidate and to notify a notice provided by the election candidate or a campaign speech schedule through the event information 30.

Figure 3:
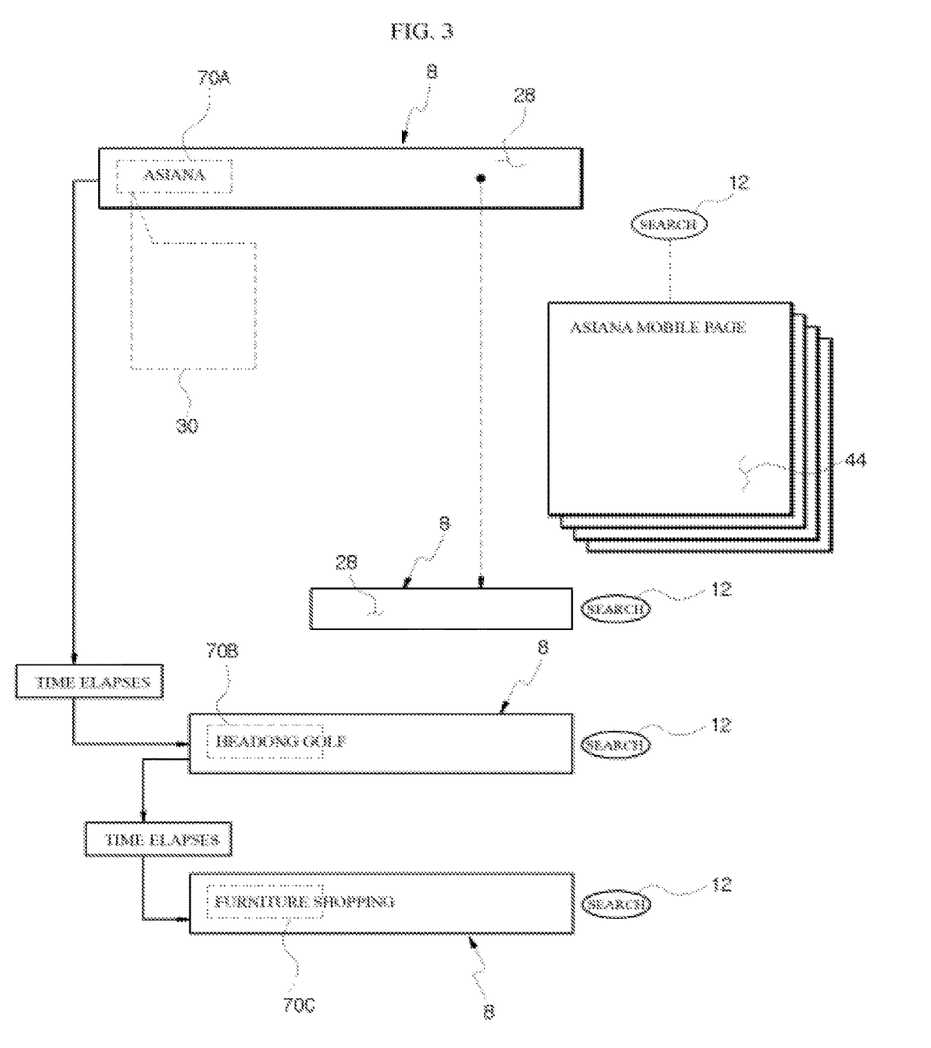
FIG. 3 is a diagram illustrating a state in which advertisements are sequentially output through the system for controlling mobile information output by using multi-access icons according to the embodiment of the present invention.

FIG. 3 is a diagram illustrating a state in which advertisements are sequentially output through the system for controlling mobile information output by using multi-access icons according to the embodiment of the present invention.

Referring to FIG. 3, the system for controlling mobile information output by using multi-access icons according to the embodiment of the present invention may display advertisement icons 70 (70A, 70B, 70C and . . . ) instead of the multi-access icon 10 that is fixedly output in the search box 8 of the icon search control application 14.

Further, the advertisement icons 70 (70A, 70B, 70C and . . . ) may be sequentially replaced and output at a predetermined time interval so as not to overlap with each other.

In this case, the advertisement icon 70 may also output the event information 30 including the discount information, etc. when being clicked, and the sequential replacement of the advertisement icons 70 in the search box 8 encourages the user to click the advertisement icon 70 to check the event information including the discount information of each company or product.

Further, since the mobile page 44 of the advertised company or product may be output by clicking the search button 12 in a state in which the advertisement icon 70 is displayed in the search box 8, ultimately, the advertisement icon 70 is the same as the multi-access icon 10 of the present invention in terms of functions.

Figure 4:
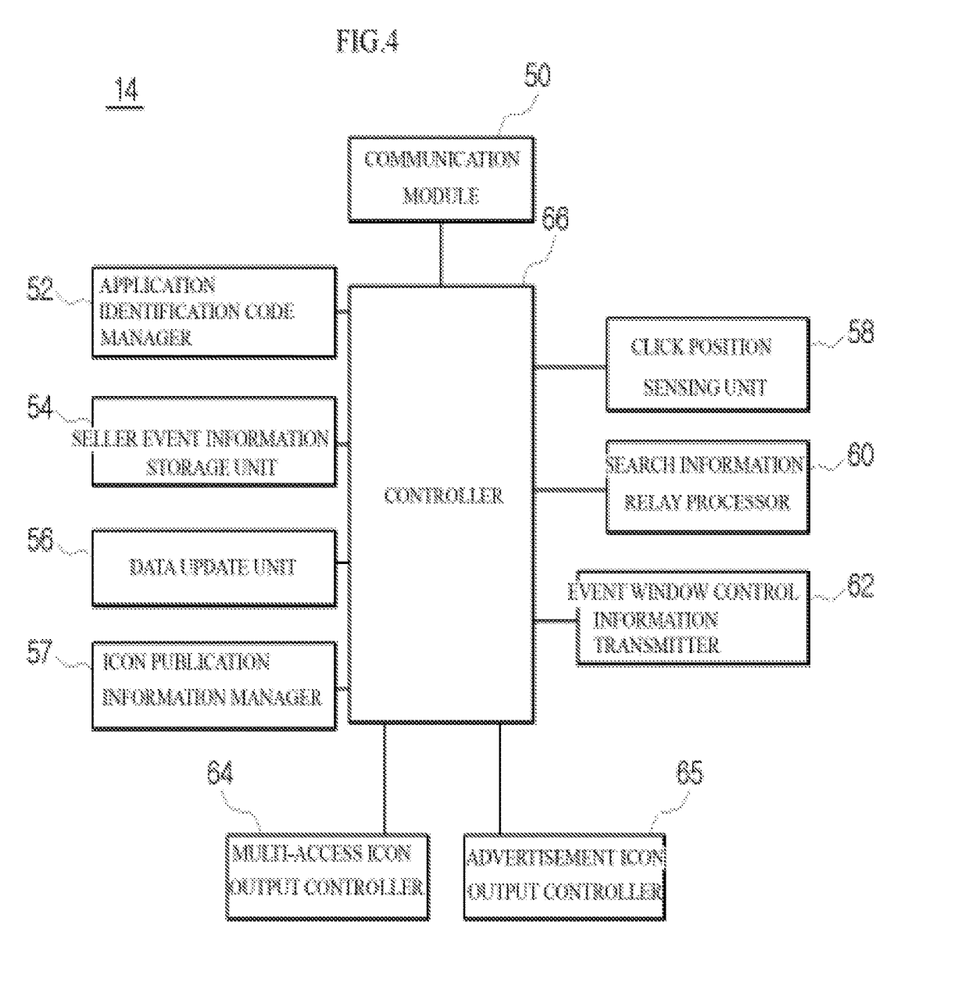
FIG. 4 is a block diagram illustrating a configuration of an icon search control application included in the system for controlling mobile information output by using multi-access icons according to the embodiment of the present invention.

FIG. 4 is a block diagram illustrating a configuration of an icon search control application included in the system for controlling mobile information output by using multi-access icons according to the embodiment of the present invention.

Referring to FIG. 4, hardware wise, a configuration of the icon search control application 14 included in the system for controlling mobile information output by using multi-access icons according to the embodiment of the present invention is described as follows.

That is, the icon search control application 14 includes: a communication module 50 configured to communicate with the multi-access search information management server 20 or the download URL relay server 24; an application identification code manager 52 configured to manage an application identification code to be included when data is transmitted to a remote server; an icon publication information manager 57 configured to manage publication information of the icon search control application 14 in which the specific multi-access icon 10 is fixed in the search box 8; a click position sensing unit 58 configured to determine whether the search button 12, the remaining area other than the multi-access icon 10, or the multi-access icon 10 is clicked in a state in which the specific multi-access icon 10 is displayed in the search box 8; and a search information relay processor 60 which relays to transmit the search word input in the search box 8 to the multi-access search information management server 20, and receive a result value thereof.

In addition, the icon search control application 14 includes: an event window control information transmitter 62 configured to control a menu published in the event information that is output by clicking the multi-access icon 10, or transmit input information input in an input window to the multi-access search information management server; a multi-access icon output controller 64 configured to control the multi-access icon 10 to be output in the search box 8 and control the multi-access icon 10 to be removed, when the remaining area 28 in the search box 8 is clicked; and a controller 66 configured to control the respective units so as to output data by detecting a click on the multi-access icon 10 that is fixedly output in the search box 8 for each application and the remaining area 28 other than the multi-access icon 10, and control the mobile page so as to be output by clicking the search button in a state in which the multi-access icon 10 is fixed in the search box 8.

Meanwhile, the icon search control application 14 further includes: a seller event information storage unit 54 configured to receive event information of a seller that is output on the screen when the multi-access icon 10 is clicked at the time of driving the application from the multi-access search information management server 20, and store the received event information; and a data update unit 56 configured to update the event information of the seller.

The icon search control application 14 further includes an advertisement icon output controller 65 configured to control the advertisement icons 70 to be output so as not to overlap with each other at a predetermined time interval on a position of the multi-access icon 10.

Functions and operations of the system for controlling mobile information output by using multi-access icons according to the embodiment of the present invention having the above-described configuration will be described in detail with reference to the accompanying drawings.

Figure 5:
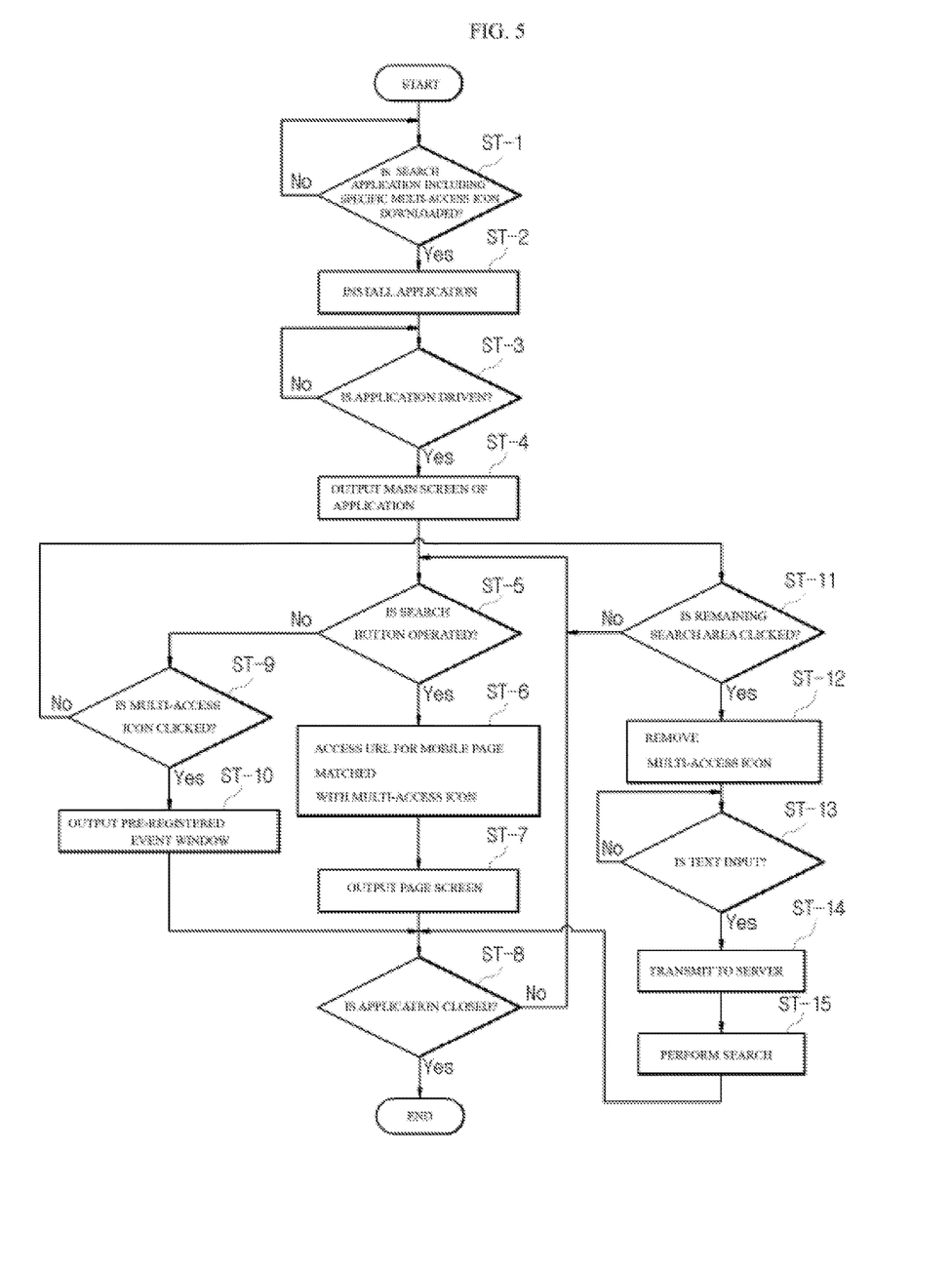
FIG. 5 is a flow chart illustrating a signal flow of the system for controlling mobile information output by using multi-access icons according to the embodiment of the present invention.

FIG. 5 is a flow chart illustrating a signal flow of the system for controlling mobile information output by using multi-access icons according to the embodiment of the present invention.

First, the system for controlling mobile information output by using multi-access icons according to the embodiment of the present invention performs a) a step of downloading and installing the icon search control application 14 in which a specific multi-access icon 10 is fixedly displayed in the search box 8 in the user terminal 2.

That is, the user may download the icon search control application 14 using the user terminal 2, thus the icon search control application 14 may be downloaded by accessing the multi-access search information management server 20, or by accessing a website or a mobile page of a company associated with the multi-access icon 10, or by using the NFC scheme.

Further, a user may download the icon search control application 14 by accessing the download URL relay server 24 of an information relay company such as a portal site.

Herein, when the user drives the icon search control application 14 by controlling the user terminal 2, b) the icon search control application 14 receives a driving signal to output the main screen 6 of the icon search control application.

Then, c) the icon search control application 14 determines whether a control signal of the search button 12 is applied in a state in which the multi-access icon 10 is displayed in the search box 8, and when the operating signal of the search button 12 is applied, d) the icon search control application 14 receives a mobile page matched with the multi-access icon 10 from the multi-access search information management server 20 and outputs the received mobile page on the screen.

In this case, before step d), the inventive system further performs a step of transmitting, by the icon search control application 14, multi-access icon identification information, mobile terminal identification information, and search button operation information to the multi-access search information management server 20.

e) When the operating signal of the search button 12 is not applied, the icon search control application 14 determines whether a click signal of the multi-access icon 10 is applied.

Meanwhile, f) when the click signal of the multi-access icon 10 is applied, the icon search control application 14 outputs the pre-stored event information 30 associated with the multi-access icon 10 on the screen.

On the other hand, g) when the click signal of the multi-access icon 10 is not applied, the icon search control application determines whether a click signal for the remaining area 28 other than the multi-access icon 10 in the search box 8 is applied.

Further, h) when the click signal for the remaining area 28 is applied, the icon search control application 14 removes the multi-access icon 10 to activate the search box 8 to be a state in which a search word may be input.

Further, I) the inventive system performs a step of receiving, by the icon search control application 14, the search word, and performing a search together with the multi-access search information management server 20.

Meanwhile, when step a) of the present invention further includes the step of downloading, by the icon search control application 14, a plurality of advertisement icons 70 from the multi-access search information management server 20, steps b) to g) may repeatedly perform the steps of: determining, by the icon search control application 14, whether the preset time elapses, and, when the preset time elapses, displaying, by the icon search control application 14, the next advertisement icon 70 in the search box 8 so as not to overlap with each other.

That is, the multi-access search information management server 20 may transmit the plurality of advertisement icons 70 to the icon search control application 14 so that the advertisement icon 70 may be output instead of the multi-access icon 10 that is fixedly output in the search box 8, and may transmit the event information 30 matched with each advertisement icon 70 so as to be stored in the user terminal 2.

Thereby, the advertisement icons 70 may be output while not overlapping with each other in the search box 8 at the preset time interval.

Figure 6:
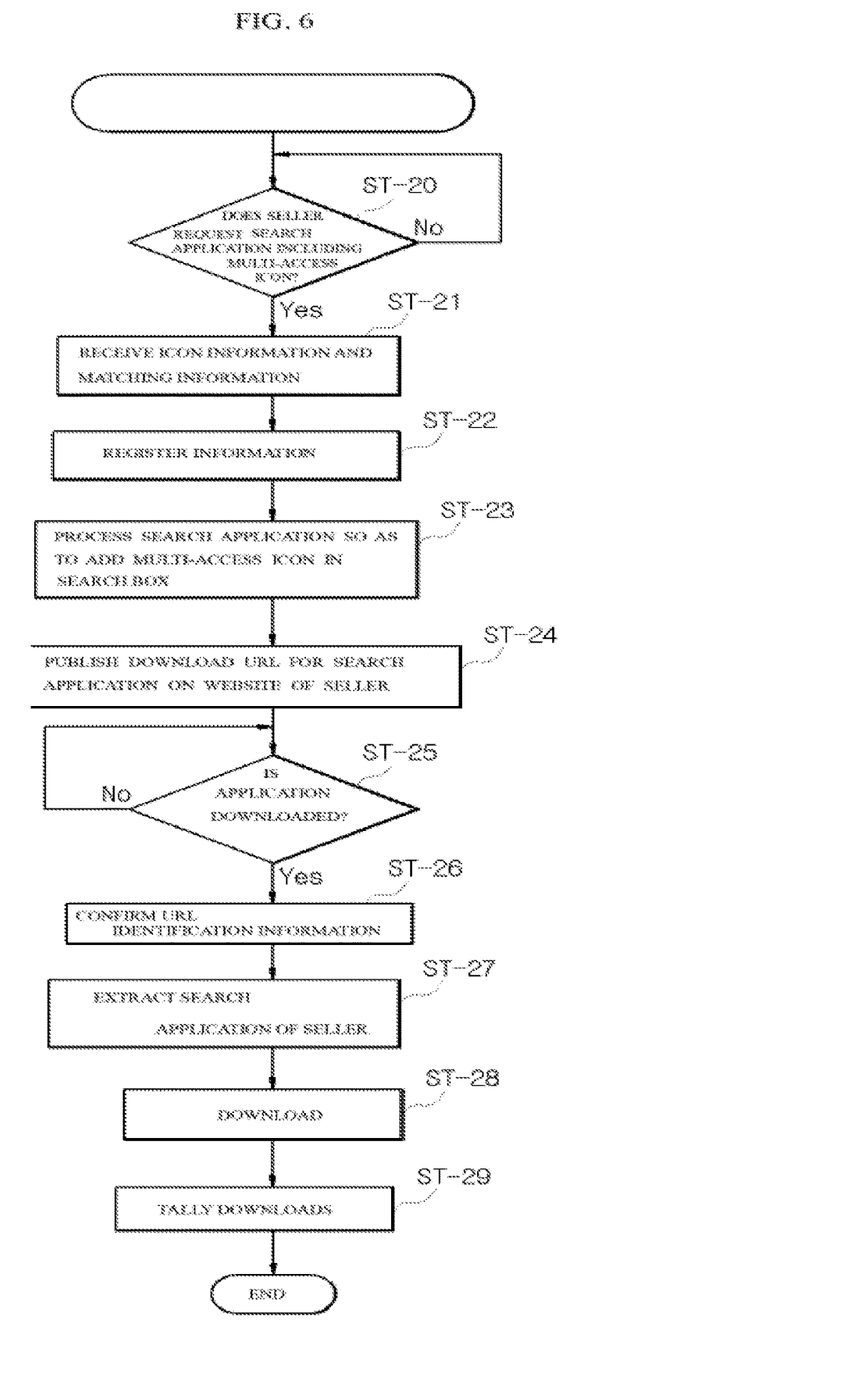
FIG. 6 is a flowchart illustrating a registration process of a dedicated multi-access icon of the system for controlling mobile information output by using multi-access icons according to the embodiment of the present invention.

FIG. 6 is a flowchart illustrating a registration process of a dedicated multi-access icon of the system for controlling mobile information output by using multi-access icons according to the embodiment of the present invention.

First, in the system for controlling mobile information output by using multi-access icons according to the embodiment of the present invention, the seller may directly request the multi-access search information management server 20 to process and distribute the icon search control application 14 so that the multi-access icon 10 associated with the company name or product name of the seller is fixedly displayed in the search box 8.

To this end, before the above-described step a), the inventive system performs the step of: accepting, by the multi-access search information management server 20, a request signal for registering a seller-dedicated multi-access icon 10; receiving information on the seller-dedicated multi-access icon 10, event information matched with the corresponding multi-access icon 10, and mobile page URL information of the seller; registering, by the multi-access search information management server 20, the information on the seller; processing, by the multi-access search information management server 20, the icon search control application 14 so as to display the multi-access icon 10 in the search box 8 in a downloadable way; and registering, by the multi-access search information management server 20, the processed icon search control application 14 in a downloadable way by matching the same with the information on the seller.

In this case, the icon search control application 14 may be distributed through a website or a mobile page of the seller, or may be distributed together with the icon search control application 14 of a plurality of sellers through the multi-access search information management server 20, or may be distributed by the known NFC scheme, or may also be distributed through the download URL relay server 24 such as a search portal site.

Herein, the term "distribution" means that a download page of the icon search control application 14 is released for users so that the icon search control application may be downloaded.

Meanwhile, when the user downloads the icon search control application 14, the number of downloaded icon search control applications 14 displaying each multi-access icon 10 is tallied. When a download source is the multi-access search information management server 20, the multi-access search information management server 20 immediately tallies the number of respective downloaded applications.

When the download source is the website of the seller or the user accesses the download page of the multi-access search information management server 20 via the mobile page of the seller, the multi-access search information management server 20 requests the icon search control application 14 to transmit URL identification information of the mobile page or the website of the seller, in order to check that any multi-access icon 10 tends to download the multi-access icon on the icon search control application 14.

Then, the multi-access search information management server 20 may extract the icon search control application 14 displaying the multi-access icon 10 of the seller so that the user terminal 2 may download the icon search control application, and may tally the download information.

Such tally information may be utilized later for calculating advertising costs.

According to the system for controlling mobile information output by using multi-access icons and the method therefor in accordance with the present invention, in the application including the search box, multi-access icons associated with the specific companies or products are output in the search box, and the event information including discount information capable of simply outputting an order/payment window may be output using the multi-access icons. Since a user may access the mobile page of the companies or the products, the main screen of the application is not annoyingly covered by a plurality of pop-up advertisements, and since the user may recognize the pre-displayed multi-access icons when inputting a search word, advertising effects may be significantly increased. When clicking the multi-access icons, the user may access the discount information or the event information, such that the click-through rate may be more increased, resulting in more increased advertising effects and a seller may provide larger benefits to loyal customers who installed the application of their company.

Meanwhile, the system for controlling mobile information output by using multi-access icons according to the embodiment of the present invention is not limited to above described embodiment, but may be variously modified without departing from the technical gist of the present invention.

DESCRIPTION OF REFERENCE NUMERALS

2: user terminal
6: main screen of application
8: search box
10: multi-access icon
12: search button
14: icon search control application
20: multi-access search information management server
22: advertiser terminal
70: advertisement icon

The invention claimed is:

1. A method for controlling mobile information output by using multi-access icons, comprising the steps of:
 a) downloading and installing an icon search control application, in which a specific multi-access icon is fixedly displayed in a search box, in a user terminal;
 b) receiving, by the icon search control application, a driving signal to output a main screen of the icon search control application and displaying the search box that includes the specific multi-access icon on the main screen before a user of the user terminal enters any information into the search box;
 c) determining, by the icon search control application, whether an operating signal of a search button is applied in a state in which the multi-access icon is displayed in the search box, wherein the search button is located outside the search box;

d) transmitting, by the icon search control application, at least one of multiple access icon identification information, mobile terminal identification information, and search button operation information to the multi-access search information management server;

e) receiving, by the icon search control application, a mobile page matched with the multi-access icon from a multi-access search information management server to output the mobile page on the main screen, when the operating signal of the search button is applied;

f) determining, by the icon search control application, whether a click signal of the multi-access icon is applied by the user, when the operating signal of the search button is not applied;

g) outputting, by the icon search control application, pre-stored event information associated with the multi-access icon on the main screen, when the click signal of the multi-access icon is applied;

h) determining, by the icon search control application, whether a click signal for a remaining area other than the multi-access icon in the search box is applied, when the click signal of the multi-access icon is not applied;

i) removing, by the icon search control application, the multi-access icon to activate the search box to be a state in which a search word is input, when the click signal for the remaining area is applied; and j) receiving, by the icon search control application, the search word to perform a search together with the multi-access search information management server, wherein the step a) further includes the step of downloading, by the icon search control application, a plurality of advertisement icons from the multi-access search information management server, and wherein steps b) to h) repeatedly perform the steps of:
  determining, by the icon search control application, whether a preset time elapses; and
  when the preset time elapses, displaying, by the icon search control application, a next one of the plurality of advertisement icons on a position of the multi-access icon so that the plurality of advertisement icons are displayed sequentially without overlapping with each other in time.

2. The method of claim 1, further comprising the steps of: before step a),
  accepting, by the multi-access search information management server, a request signal for registering a seller-dedicated multi-access icon;
  receiving information on the seller-dedicated multi-access icon, event information matched with the corresponding multi-access icon, and URL information of a mobile page of the seller;
  registering, by the multi-access search information management server, information on the seller;
  processing, by the multi-access search information management server, the icon search control application so as to display the multi-access icon in the search box; and
  registering, by the multi-access search information management server, the processed icon search control application in a downloadable way by matching the same with the information on the seller.

3. The method of claim 1, further comprising the steps of: between step a) and step b),
  transmitting, by the icon search control application, download information to the multi-access search information management server; and tallying, by the multi-access search information management server, the download information of the application for each seller using identification information of the application.

4. A system for controlling mobile information output by using multi-access icons, comprising:
  a user mobile terminal, in which an icon search control application configured to perform a control so that a multi-access icon is operably displayed in a search box to selectively output event information or a mobile page on which information on companies or products is published, and perform communication with a multi-access search information management server for outputting information associated with the multi-access icon on a screen, is installed, wherein the multi-access icon is displayed on the user mobile terminal before a user of the user mobile terminal enters any information into the search box; and
  the multi-access search information management server configured to publish the icon search control application in a downloadable way, and transmit event information and information of a mobile page that are output on the screen when clicking the multi-access icon output on a main screen of the icon search control application or when clicking a search button, wherein the search button is located outside the search box,
  wherein the icon search control application is configured to output the event information including information on the companies or discount information of the products or simple product information, and information for inputting order and payment information, when the user clicks the multi-access icon displayed in the search box, and
  wherein the icon search control application further comprises an advertisement icon output controller configured to display a next one of a plurality of advertisement icons on a position of the multi-access icon at each predetermined time interval so that the plurality of advertisement icons are displayed sequentially without overlapping with each other in time.

5. The system of claim 4, wherein the icon search control application is configured to control an output state of the search box so that the specific multi-access icon is fixedly output in the search box at all times.

6. The system of claim 4, wherein the icon search control application is configured to remove the multi-access icon, such that another search word is input, when a remaining area other than an output area of the multi-access icon in the search box is clicked.

7. The system of claim 4, wherein the icon search control application is configured to automatically transmit information of the multi-access icon and the search button to the multi-access search information management server when clicking the search button in a state in which the specific multi-access icon is displayed in the search box, and
  the multi-access search information management server is configured to extract the mobile page matched with the multi-access icon and the search button in advance and transmit the extracted mobile page.

8. The system of claim 4, wherein the multi-access search information management server is configured to accept and register a distribution request signal of the icon search control application in which the multi-access icon including specific company names or product names is fixedly displayed in the search box from an advertiser terminal.

9. The system of claim 4, further comprising:
a download URL relay server configured to publish and distribute URL information of a download window of the multi-access search information management server for downloading the icon search control application in which the multi-access icon including the specific company names or the product names is fixedly displayed, so that the user terminal accesses the download window.

10. The system of claim 4, wherein the icon search control application is configured to change the multi-access icon output in the search box so as not to overlap at a predetermined time interval.

11. The system of claim 4, wherein the multi-access icon is an icon that includes a text or an image and allows a user to access event information and a mobile page associated with the specific company names, product names, service names, or election candidates.

12. The system of claim 4, wherein the icon search control application comprises:
a communication module configured to communicate with the multi-access search information management server or the download URL relay server;
an application identification code manager configured to manage an application identification code to be included when data is transmitted to a remote server;
an icon publication information manager configured to manage publication information of the icon search control application in which the specific multi-access icon is fixed in the search box;
a click position sensing unit configured to determine whether the search button, the remaining area other than the multi-access icon, or the multi-access icon is clicked in a state in which the specific multi-access icon is displayed in the search box;
a search information relay processor which relays to transmit a search word input in the search box to the multi-access search information management server, and receive a result value thereof;
an event window control information transmitter configured to control a menu published in the event information that is output by clicking the multi-access icon, or transmit input information input in an input window to the multi-access search information management server;
a multi-access icon output controller configured to control the multi-access icon to be output in the search box, and control the multi-access icon to be removed, when the remaining area in the search box is clicked; and
a controller configured to control the respective units so as to output data by detecting a click on the multi-access icon that is fixedly output in the search box for each application and the remaining area other than the multi-access icon, and control the mobile page so as to be output by clicking the search button in a state in which the multi-access icon is fixed in the search box.

13. The system of claim 4, wherein the icon search control application further comprises:
a seller event information storage unit configured to receive event information of a seller that is output on the screen when the multi-access icon is clicked at the time of driving the application from the multi-access search information management server, and store the received event information; and
a data update unit configured to update the event information of the seller.

14. The system of claim 4, further comprising:
a near field communication (NFC) card configured to publish and distribute URL information of a download page of the multi-access search information management server that is read by the user terminal using a near field wireless communication scheme to download the icon search control application.

* * * * *